United States Patent [19]
Mead

[11] Patent Number: 5,782,429
[45] Date of Patent: Jul. 21, 1998

[54] VIDEO COMPRESSION FOR MISSILE TERMINAL GUIDANCE

[75] Inventor: Donald C. Mead, Carlsbad, Calif.

[73] Assignee: Hughes Electronics Corporation, Los Angeles, Calif.

[21] Appl. No.: 767,132

[22] Filed: Dec. 19, 1996

[51] Int. Cl.[6] .................................................. F41G 7/30
[52] U.S. Cl. ................................... 244/3.11; 382/238
[58] Field of Search .............................. 382/103, 107, 382/236, 238; 244/3.11, 3.16, 3.17; 348/114, 117

[56] References Cited

U.S. PATENT DOCUMENTS

| | | | |
|---|---|---|---|
| 5,452,377 | 9/1995 | Igarashi | 382/238 |
| 5,458,041 | 10/1995 | Sun et al. | 89/1.11 |
| 5,537,909 | 7/1996 | Schneider et al. | 89/1.11 |
| 5,544,239 | 8/1996 | Golin et al. | 382/236 |
| 5,604,534 | 2/1997 | Hedges et al. | 348/144 |
| 5,605,307 | 2/1997 | Batchman et al. | 244/3.11 |
| 5,625,715 | 4/1997 | Trew et al. | 382/236 |
| 5,626,311 | 5/1997 | Smith et al. | 244/3.16 |
| 5,663,764 | 9/1997 | Kondo et al. | 348/414 |
| 5,673,339 | 9/1997 | Lee | 382/236 |
| 5,703,966 | 12/1997 | Astle | 382/236 |

FOREIGN PATENT DOCUMENTS 2232748  12/1990  United Kingdom .............. 244/3.11

*Primary Examiner*—Charles T. Jordan
*Assistant Examiner*—Christopher K. Montgomery
*Attorney, Agent, or Firm*—Georgann S. Grunebach; Terje Gudmestad; Michael W. Sales

[57] ABSTRACT

A method and apparatus for improving aim point accuracy in a programmable flight control missile includes a communication system for receiving at least one frame of imagery in a vision system mounted in a missile, predicting a subsequent frame content based on the content of the previous frame as a function of missile path height, missile velocity, and frame rate, and creating a residual image by determining the difference between a predicted subsequent frame content and actually received frame content. In the preferred embodiment, the residual image can be transferred at a high bit rate through a communication system into a controller at which location correction data can be generated and delivered to the communication system to the missile in flight. Preferably, the predicted subsequent video frame and the sensed subsequent frame content are centrally aligned before creating a residual image. Preferably, a small, high entropy block of pixels is considered to determine an x or y vector for the point of best match, and the residual image is selectively quantized and entropy coded for transmission.

10 Claims, 2 Drawing Sheets

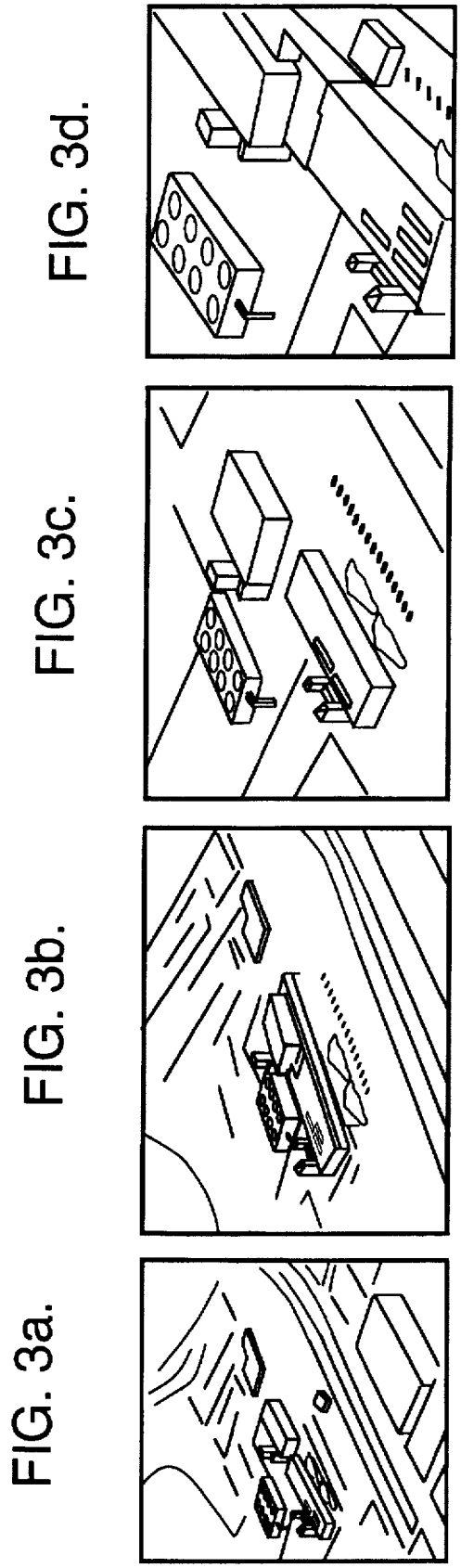

VIDEO COMPRESSION FOR MISSILE TERMINAL GUIDANCE

TECHNICAL FIELD

The present invention relates to communication systems for missile guidance including a method and apparatus for improving accuracy of the missiles movement toward a target by communication of visual information about the target area and correspondingly correcting the missile aim point by in-flight target updates. (IFTU).

BACKGROUND ART

The flight of missiles is currently controlled by loading initial target location data into the missile prior to launch and then guiding the missile to the target via a global positioning system. Although targeting is relatively precise considering the long range that the missile travels, inaccuracies of a few meters can be very important for particular types of targets. For example, the effect of a missile hitting the top of a dam is substantially different than the effect of an impact in the water behind the dam. Even when terminal guidance is employed, aimpoint improvement is possible through an IFTU, but only with low resolution images in a reasonable time frame or at a low frame rate.

SUMMARY OF THE INVENTION

The present invention overcomes the above-mentioned disadvantages by providing back link imagery which provides the basis for an in-flight target update. Data compression based on a priori knowledge reduces the amount of information that needs to be conveyed, and renders low bit rate communications to provide lower expense for complete data transmission. A number of relay communication techniques can be used, but preferably involve a geosynchronous satellite communication system.

In the preferred embodiment, the transmission of video information from a camera mounted on the missile is symbolically compressed for transmission via the geosatellite to the missile operator. Although previously known video compression techniques such as MPEG 2 standard (Moving Picture Experts Group) developed under the auspices of the International Standards Organization could be utilized, the preferred embodiment employs symbolic compression based on a priori data about the content of the frame sequences. Rather than merely squeezing the redundancy out of the rasters spatially and temporally in the raster of pixels and the sequence of frames as the sequence of such rasters, symbolic compression employs the fact that the next succeeding frame is an affine dilation (a zoom or enlarged representation) of a subimage of the prior frame. As a result, the next frame can be predicted fairly accurately knowing the missile height, velocity, and the frame rate. As a result, the amount of the information that must be transmitted is substantially reduced because it can be re-created from the prior frame.

In the preferred embodiment, super compression in the transmitter on the missile employs a technique for forming a residual image as the difference between a sensor generated image and an image that is predicted from the prior frame. The residual image is coded and transmitted to the receiver. Since the residual image will not be correct if frames are not aligned, the sensor generated image and the predicted image are aligned by shifting the images with respect to each other until a best fit is found. Moreover, since it is desirable to have a fixed bit rate, transmission of the entire first frame is preferably sent over a number of frame intervals. Accordingly, the frame is hierarchically coded.

As a result, the present invention decreases the amount of image data required to be transmitted as back linked information. For example, in the preferred embodiment, the information sent back to the operator can be 25–50 times less than the transfer of imaging information compressed from other known methods of iconic compression. As a result, the present invention reduces the required missile antenna aperture, the missile transmitter power required, or the invention permits increased image resolution or increased frame rate at which communication can be conveyed.

BRIEF DESCRIPTION OF THE DRAWING

The present invention will be more clearly understood by reference to the following detailed description of a preferred embodiment when read in conjunction with the accompanying drawing in which like reference characters refer to like parts throughout the views and in which:

FIG. 3 is a diagrammatic representation of sequential frames showing the relative difference between subsequent or predicted frames and an original image frame.

DETAILED DESCRIPTION OF THE PREFERRED EMBODIMENT

Figure 1:
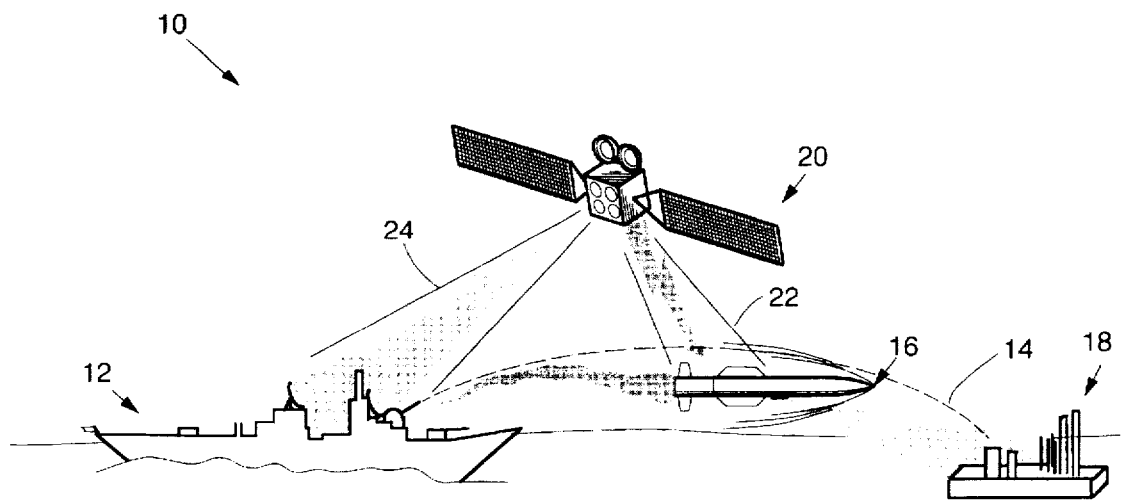
FIG. 1 is a system for missile terminal guidance constructed according to the present invention.
Figure 2:
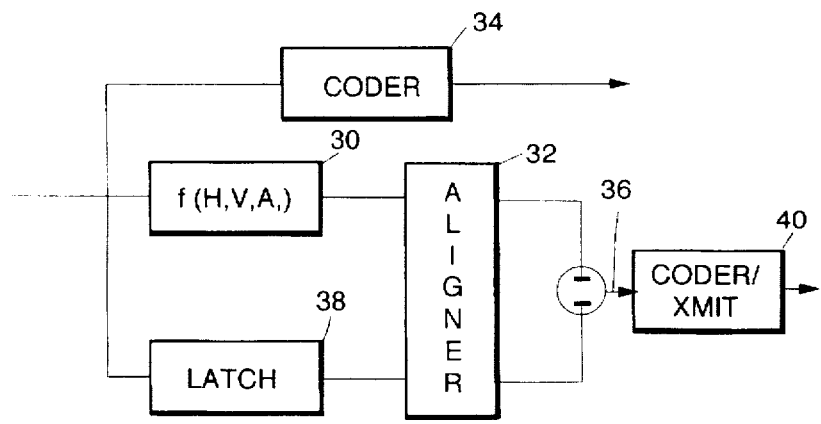
FIG. 2 is an imagery process recording apparatus used in the system of FIG. 1.

Referring first to FIG. 1, a missile control system 10 for terminal guidance is thereshown comprising a control source 12 from which the path 14 of a missile 16 is initiated. The path 14 begins at a launch site remotely located from its termination at a target 18. The system 10 includes a communication system 20, preferably a relay communication system in which a geosynchronous satellite is the relay station between source 12 and missile 16. Nevertheless, unmanned area vehicles (UAVs) can also be used to relay to provide high data rate, jam-resistant network that add two-way communication ability between the source 12 and the missile 16.

As the missile 16 launched with basic mission plans guide them toward a projected target location. A video back link is transmitted from the missile 16 through beam 22 to the satellite 20 and through a beam 24 to the controller 12. Preferably, the communication signals are transmitted through a single beam throughout the path of a missile 16 to avoid complicated switching requirements and the power requirements for the signaling through multiple beams.

In the present invention, compression is obtained by reliance upon a priori knowledge about the content of video images to provide symbolic compression that results in substantially greater compression ratios than can be achieved by iconic compression. Video image from a camera located on the missile 16 approaching a target provides a sequence of frames in which subsequent frames have a substantial relationship to the previous frames. In particular, the affine dilation is an enlarged or zoom image of the previous frame as demonstrated in the sequence of frames shown in FIG. 3. Accordingly, the subsequent frame can be predicted at a predictor 30 with a high degree of accuracy as a function of the missile height, the missile velocity and the frame rate of the camera.

In the preferred embodiment, the residual image is created by the transmitter in the missile by generating two images for each frame. The first image is the actually sensed image generated by the sensor as well as the second image that is predicted from the prior frame. These two images or their representative signals are subtracted to form a residual image 36. Since the level of prediction is very high, the residual image 36 has little energy and does not require a substantial bit rate. As a result, once the initial image is transmitted completely, the subsequent transmission of residual images provides accurate updating information regarding the target location at very low bit rates.

In order to form a more accurate residual image 36, the first frame image and the second frame image are aligned at an aligner 32 by shifting the images with respect to each other until a "best fit" is found. In view of the large priori information, the center of the image can move only a small distance frame-to-frame, and the corresponding computation is minimal to align one image with the other. Preferably, a small, high entropy block of pixels can be matched to determine the x and y vectors for the point of best match.

In addition, since a complete first frame includes a substantial amount of information, the bit rate required can be lowered by transmitting the information over several frame intervals. Accordingly, the frame is preferably coded hierarchically at filter 34 to reconstruct the image methodically after segments of information have been transmitted over several intervals. Preferably, the low frequency information is sent first, followed by data for increasing spatial frequencies. Quadrature mirror filters or wavelets could be used to form the hierarchical coding of the signal to be sent by the transmitter from the missile to the satellite to the controller.

As a result, the present invention decreases the amount of data required to transmit back link information, for example, in the preferred embodiment by a factor of 25-50 over previous compression techniques, to obtain several advantages. In particular, the size of the antenna used on the missile can be substantially reduced over the size of antennas required to convey the amount of information previously required for conveying a series of frame images in previously known communication systems, and can substantially reduce the power required to transmit the information from the missile. Alternatively, the image resolution which can be conveyed is substantially improved over the previously known communication systems having limited bit rates, or the frame rate can be substantially increased.

Having thus described the present invention, many modifications thereto will become apparent to those skilled in the art to which it pertains without departing from the scope and spirit of the present invention as defined in the appended claims.

What is claimed is:

1. A method for improving aim point accuracy in a programmable flight control missile, comprising:

receiving at least one frame of imagery in a vision system mounted on the missile;

predicting a subsequent frame content based on the content of said at least one frame as a function of missile path height, missile velocity and frame rate;

sensing a subsequent frame content;

creating a residual image by determining the difference between said predicted subsequent frame content and said sensed subsequent frame content;

coding said at least one frame and said residual image in a signal message.

2. The invention as defined in claim 1 and further comprising transmitting said signal message to a flight controller for creation of in-flight target update programming.

3. The invention as defined in claim 1 wherein said creating step comprises aligning said predicted subsequent frame content with said sensed subsequent frame content.

4. The invention as defined in claim 3 wherein said aligning step comprises shifting the images for a best fit.

5. The invention as defined in claim 2 wherein said transmitting step comprises coding said at least one frame hierarchically.

6. The invention as defined in claim 5 wherein said hierarchically coding comprises filtering vision data through quadrative mirror filters.

7. The invention as defined in claim 5 wherein said hierarchically coding comprises filtering vision data through wavelets.

8. The invention as defined in claim 7 and further comprising generating in-flight target update data and sending said in-flight target update data to said missile, said transmitting and said sending steps including communicating through a satellite broadcast system relay.

9. A missile terminal guidance system, comprising:

a receiver including a camera receiving at least one frame;

a processor for generating a prediction of a subsequent frame content based on said at least one frame as a function of missile height, missile velocity and camera frame rate;

said camera receiving a subsequent frame content after a first of said at least one frame;

a subtracter for creating a residual image from said prediction of subsequent frame content and said received subsequent frame content; and an encoder for representing said first of said at least one frame and said residual image in a signal message.

10. A system as defined in claim 9 whereby said first frame is sent out over a plurality of initial frame rate durations to permit a fixed transmission bit rate.

* * * * *